Oct. 11, 1938.  K. BAUMERT ET AL  2,133,244
PROCESS OF RECOVERING CARBON BISULPHIDE
Filed March 29, 1935
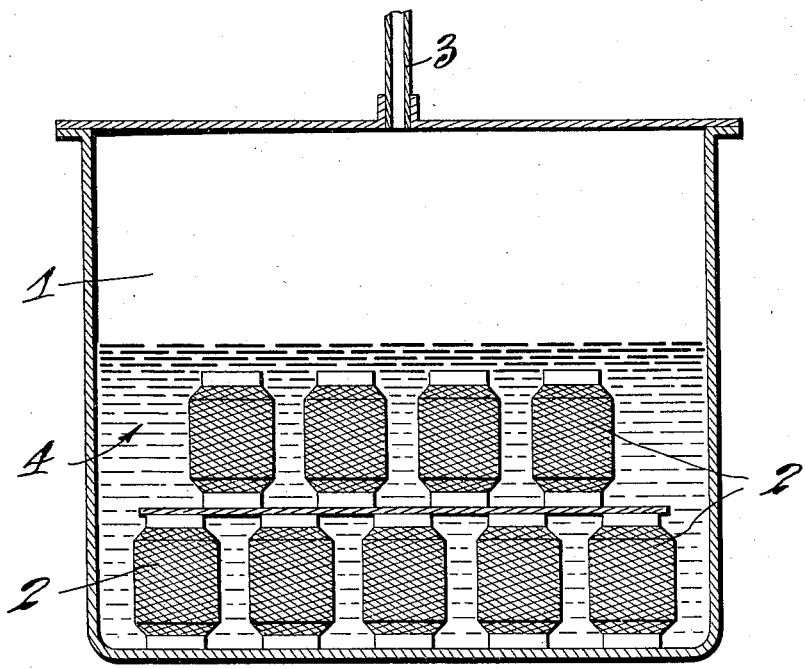
Inventor
Karl Baumert,
Rudolph S. Bley.
By Thomas H. Byron
Attorney Patented Oct. 11, 1938

2,133,244

UNITED STATES PATENT OFFICE 2,133,244

PROCESS OF RECOVERING CARBON BISULPHIDE

Karl Baumert and Rudolph S. Bley, Elizabethton, Tenn., assignors to North American Rayon Corporation, New York, N. Y., a corporation of Delaware Application March 29, 1935, Serial No. 13,790

6 Claims. (Cl. 18—54)

The present invention relates to a process of recovering carbon bisulphide from freshly spun or otherwise prepared, i. e., "green" viscose products.

The primary object of our invention relates to the evacuation of freshly formed viscose products "in statu nascendi" to remove therefrom carbon bisulphide vapors which, subsequently, may be converted into liquid carbon bisulphide.

Another object of this invention has to do with an intermittent evacuation of "green" viscose products to remove carbon bisulphide therefrom.

A third object of our invention relates to a process of regulating and accelerating the escape of carbon bisulphide from "green" viscose products submerged in aqueous solutions of such electrolytes which are inert to regenerated cellulose and carbon bisulphide.

A fourth object of our invention has to do with a combined vacuum and heat treatment of "green" viscose products to remove carbon bisulphide therefrom without affecting their cellulose content.

A fifth object of this invention relates to the removal of carbon bisulphide from "green" viscose rayon wound on spools, collected in the form of cakes in spinning pots, etc.

Other objects of our invention will become apparent to those skilled in the art from a study of the following specification and attached drawing in which is illustrated a diagrammatic cross-sectional view of the apparatus for carrying out the novel process comprising the invention.

In the manufacture of viscose products, sodium hydroxide is caused to react with cellulose to form the so-called "alkali cellulose". After ageing, the alkali cellulose is intimately mixed with carbon bisulphide to form therewith, by chemical interaction, cellulose xanthogenate. This compound is dissolved in a dilute, alkaline solution and, then, is called "viscose". The viscose solution is stored at a low temperature to attain a proper degree of ripeness and, subsequently, extruded through fine orifices into an acid spinning bath in which it is decomposed to form regenerated cellulose and a number of waste products, such as carbon bisulphide, hydrogen sulphide, thiocarbonates, etc. A portion of the carbon bisulphide escapes during the spinning process, but large amounts thereof remain in the hydrated, regenerated cellulose. During the spinning, the regenerated cellulose, i. e., viscose rayon, is collected on spools, in spinning pots, in the form of films on drums, etc. Viscose, however, may be treated also in suitable molds to form various articles of regenerated cellulose and the carbon bisulphide may be recovered therefrom in accordance with our present invention. Such freshly spun or molded products, called "green" viscose products in the art, are subsequently washed to remove setting bath ingredients therefrom and desulphurized. Thus, valuable carbon bisulphide, originally present in regenerated cellulose "in statu nascendi" is lost in the washing and desulphurizing baths.

In accordance with our present invention, we are able to recover in a simple and inexpensive manner considerable amounts of carbon bisulphide from "green" viscose products, i. e., freshly spun or coagulated viscose products and viscose products "in statu nascendi". We accomplish this by placing, for example, freshly spun viscose products 1, such as yarn bodies on spools, in a closable chamber 2 of suitable construction which allows evacuation through a vacuum line 3 to such extent that the carbon bisulphide will escape from the regenerated cellulose in the form of vapors which, subsequently, may be recovered by condensation, compression, absorption, adsorption, etc. Instead of placing freshly spun, or otherwise formed viscose products in a separate vacuum chamber, we may surround the spinning or molding machine with tightly fitting walls of suitable material to form a chamber which may be constantly or intermittently evacuated. In this manner, the carbon bisulphide will be removed from the regenerated cellulose "in statu nascendi", i. e. at the very moment of its formation. This method is especially suitable for the recovery of carbon bisulphide from viscose products, such as yarns, ribbons, etc., collecting on spools or in spinning pots.

By placing the spinning pot, for example, in a vacuum chamber of such construction which allows the entrance of a freshly spun viscose product under maintenance of a sufficient vacuum, carbon bisulphide may be recovered in vapor form from the regenerated cellulose. In addition, this method assures great savings in the power consumption of the rotating pot. In the spool-spinning process, the freshly precipitated cellulose may be passed through a vacuum chamber or the entire spinning machine with all operating parts may be placed in a suitable chamber which may be constantly or intermittently evacuated. Pot-spinning or molding machines may be placed also in suitable vacuum chambers to recover carbon bisulphide escaping from regenerated cellulose "in statu nascendi".

Since the "green" viscose products are cooled considerably during the aforementioned vacuum treatment, they may become frozen and consequently damaged. We have, however found by experimentation that this serious drawback can be overcome by an intermittent evacuation of the chamber 2, this evacuation being, preferably, combined with an adequate heat treatment. If the chamber 2 is heated to such extent that a freezing or great undercooling of "green" viscose products is prevented during the constant or intermittent evacuation, the evaporation of carbon bisulphide will be accelerated without damage to the regenerated cellulose. Thus, we may also constantly evacuate the chamber 2 in combination with a suitable heat treatment, although it is to be noted that in this case the proper regulation of vacuum and heat is rendered more difficult. In accordance with our invention, we may provide the vacuum chamber with suitable mechanical means to reduce and increase the pressure therein at predetermined intervals of time. The carbon bisulphide may be removed from the evacuated chamber 2 when air is periodically admitted thereto, and it may be moderately heated by suitable means to counteract the lowering of its temperature by the rapid evaporation of carbon bisulphide from "green" viscose products 1. Since the rate of evaporation of carbon bisulphide depends upon the degree of evacuation as well as the temperature of the chamber, it must be predetermined by experiment and carefully regulated to prevent damages to the regenerated or regenerating cellulose under vacuum treatment.

Furthermore, we have found that the evaporation of carbon bisulphide may be more efficiently regulated by evacuating the "green" viscose products while being submerged in water, aqueous solutions of electrolytes, non-electrolytes, etc., which are indicated at 4 on the drawing. For this reason, we prefer to evacuate the viscose products, set forth above, during the formation of regenerated cellulose in coagulating baths, or to submerge already formed, but unwashed and undesulphurized, viscose products in cold or moderately heated water, cold or moderately heated solutions of inorganic and organic compounds, etc. In this manner, it becomes possible to regulate the escape of carbon bisulphide from these "green" products. In addition the formation of deleterious setting bath crystals on regenerated cellulose is effectively prevented. In a preferred modification of this process, we submerge freshly formed, but unwashed, regenerated cellulose in a solution prepared from inorganic or organic compounds, or combinations thereof, before constantly or intermittently evacuating the chamber, said solutions having a controlled osmotic pressure or being isotonic with respect to regenerated cellulose. Any inorganic or organic compound, or combinations thereof, may be used in the preparation of such baths provided it does not chemically attack regenerated cellulose in finished or unfinished form, or carbon bisulphide. These solutions may be maintained at a proper temperature to prevent freezing of the "green" viscose products submerged therein during constant or intermittent evacuation. Although we have found magnesium sulphate, sodium sulphate, sulphuric acid, etc., to be suitable as ingredients of the aforementioned baths, we do not wish to be limited to the use of these compounds which are merely illustrative. Since a freshly spun viscose product, or a viscose product "in statu nascendi" contains setting bath electrolytes, it exerts a considerable osmotic pressure. Thus, if regenerated cellulose in a "green" state is submerged, for example, in a salt solution having a lower osmotic pressure, it swells and may be deleteriously affected. If regenerated cellulose, however, is submerged, for example, in a salt solution exerting a higher osmotic pressure than the electrolytes enclosed within a membrane of the aforementioned cellulose, it will shrink and become damaged. For such reasons, we prefer to submerge "green" viscose products in isotonic solutions, or in other words, in solutions exerting the same osmotic pressure as the soluble compounds enclosed in the regenerated cellulose. Such isotonic solutions may be prepared by dissolving inorganic and organic compounds, etc., in water and be maintained at a predetermined, elevated temperature during the evacuation of "green" viscose products submerged therein. Since the osmotic pressure of a "green" viscose product varies in accordance with its salt content, etc., suitable isotonic solutions must be prepared and adjusted to proper concentration by preliminary experiments. Agents which reduce the surface tension of water or solutions containing inorganic or organic compounds, such as soaps, sulphonated oils, alkali metal salts of sulphonated oils, saponins, etc., may be added to the baths for submerging "green" viscose products to accelerate the removal of carbon bisulphide in vacuo. Such agents may also be added to the spinning baths when the spinning machine per se is placed in a chamber which can be constantly or intermittently evacuated.

Modifications of our invention will be readily recognized by those skilled in the art, and we desire to include all such modifications coming within the scope of the appended claims. In these claims the term "green" viscose products embraces freshly formed viscose products and viscose products "in statu nascendi".

We claim:

1. The process of recovering carbon bisulphide from a "green" viscose product which comprises evacuating said product before being washed to remove carbon bisulphide vapors therefrom and subsequently converting said vapors into liquid carbon bisulphide, said product being submerged during evacuation in a substantially isotonic solution chemically inert to regenerated cellulose and carbon bisulphide.

2. The process of recovering carbon bisulphide from a "green" viscose product which comprises evacuating said product before being washed to remove carbon bisulphide vapors therefrom and subsequently converting said vapors into liquid carbon bisulphide, said product being submerged during evacuation in a substantially isotonic salt solution chemically inert to regenerated cellulose and carbon bisulphide.

3. The process of recovering carbon bisulphide from a "green" viscose product which comprises evacuating said product before being washed to remove carbon bisulphide vapors therefrom and subsequently converting said vapors into liquid carbon bisulphide, said product being submerged during evacuation in a substantially isotonic solution chemically inert to regenerated cellulose and carbon bisulphide, and said solution containing a surface tension-reducing agent.

4. The process of recovering carbon bisulphide from a "green" viscose product which comprises intermittently evacuating said product before being washed to remove carbon bisulphide vapors therefrom and subsequently converting said 5. The process of recovering carbon bisulphide from a "green" viscose product which comprises intermittently evacuating said product before being washed to remove carbon bisulphide vapors therefrom and subsequently converting said vapors into liquid carbon bisulphide, said product being submerged during evacuation in a substantially isotonic salt solution chemically inert to regerenerated cellulose and carbon bisulphide.

6. The process of recovering carbon bisulphide from a "green" viscose product which comprises intermittently evacuating said product before being washed to remove carbon bisulphide vapors therefrom and subsequently converting said vapors into liquid carbon bisulphide, said product being submerged during evacuation in a substantially isotonic solution chemically inert to regenerated cellulose and carbon bisulphide, and said solution containing a surface tension-reducing agent.

KARL BAUMERT.
RUDOLPH S. BLEY.